(12) United States Patent
Holley et al.

(10) Patent No.: US 6,292,251 B1
(45) Date of Patent: Sep. 18, 2001

(54) METHOD AND APPARATUS FOR SEQUENTIAL EXPOSURE PRINTING OF ULTRA HIGH RESOLUTION DIGITAL IMAGES USING MULTIPLE SUB-IMAGE GENERATION AND A PROGRAMMABLE MOVING-MATRIX LIGHT VALVE

(75) Inventors: Steven E. Holley, Cushing; J. David Holley, Stillwater, both of OK (US)

(73) Assignee: Electronic Systems Engineering Co., Cushing, OK (US)

( * ) Notice: Subject to any disclaimer, the term of this patent is extended or adjusted under 35 U.S.C. 154(b) by 0 days.

(21) Appl. No.: 09/164,281

(22) Filed: Oct. 1, 1998

Related U.S. Application Data (63) Continuation of application No. 08/814,715, filed on Mar. 11, 1997, now Pat. No. 5,844,663.
(60) Provisional application No. 60/026,060, filed on Sep. 13, 1996.

(51) Int. Cl.$^7$ .......................... G03B 27/32; G02F 1/1347
(52) U.S. Cl. ................................................ 355/32; 349/77
(58) Field of Search ............................. 355/32; 345/501; 395/101; 347/239, 252; 349/77

(56) References Cited

U.S. PATENT DOCUMENTS

| | | | |
|---|---|---|---|
| 4,992,824 | 2/1991 | Plummer | 335/38 |
| 5,109,281 | 4/1992 | Kobori et al. | 358/296 |
| 5,113,494 | 5/1992 | Menendez et al. | 395/163 |
| 5,282,255 | 1/1994 | Bovik et al. | 382/56 |
| 5,327,257 | 7/1994 | Hrytzak et al. | 358/447 |
| 5,336,879 | 8/1994 | Sauer | 250/208.1 |
| 5,341,174 | 8/1994 | Xue et al. | 348/576 |
| 5,373,347 | 12/1994 | Shaklee | 355/20 |
| 5,414,811 | 5/1995 | Parulski et al. | 395/162 |
| 5,416,509 | 5/1995 | Sombrowsky | 348/42 |
| 5,426,010 | 6/1995 | Morton | 430/22 |
| 5,438,636 | 8/1995 | Surka | 382/279 |
| 5,440,399 | 8/1995 | Lee | 358/300 |
| 5,467,404 | 11/1995 | Vuylsteke | 382/274 |
| 5,485,554 | 1/1996 | Lowitz et al. | 395/116 |
| 5,490,009 | 2/1996 | Venkateswar et al. | 359/291 |
| 5,493,428 | 2/1996 | Kim | 359/54 |
| 5,499,044 | 3/1996 | Collette | 347/232 |
| 5,508,826 | 4/1996 | Lloyd et al. | 358/501 |
| 5,530,789 | 6/1996 | Miyazaki | 395/101 |
| 5,771,060 | * 6/1998 | Nelson | 347/239 |
| 5,801,800 | * 9/1998 | Wright et al. | 349/77 |
| 5,982,407 | * 11/1999 | Enomoto et al. | 347/239 |

* cited by examiner

*Primary Examiner*—Russell Adams
*Assistant Examiner*—Peter B. Kim
(74) *Attorney, Agent, or Firm*—Locke Liddell & Sapp LLP (57) ABSTRACT

An ultra high resolution photographic printing system that generates and rasterizes multiple sub-images synchronized with positioning coordinates that program a moving-matrix light valve during sequentially timed exposures. Diagonal displacement masking operations prepare a 16384×12288 ultra high resolution image for bicubic resampling that generates four unique 4096×3072 intermediate images. These four intermediate images are sieve-sorted based on X and Y modal logic into four unique image sets of 16 unique 1024×768 raster images per set. Each of the 64 unique images sequentially reconstruct a unique "window screen view" of the original high resolution image as dictated by the geometry of the moving-matrix light valve. The moving-matrix light valve is positioned with dual axis micro-stepping motors and leadscrew assemblies. The serial geometry of the light valve RGB elements is sequentially converted to parallel geometry in the printed image. The original high resolution image is seamlessly reconstructed onto photographic media during 192 RGB additive exposures from 64 unique raster images.

6 Claims, 11 Drawing Sheets

METHOD AND APPARATUS FOR SEQUENTIAL EXPOSURE PRINTING OF ULTRA HIGH RESOLUTION DIGITAL IMAGES USING MULTIPLE SUB-IMAGE GENERATION AND A PROGRAMMABLE MOVING-MATRIX LIGHT VALVE

RELATED APPLICATION

This application is a continuation of patent application Ser. No. 08/814,715 filed on Mar. 11, 1997 now U.S. Pat. No. 5,844,663 entitled "Method and Apparatus for Sequential Exposure Printing of Ultra High Resolution Digital Images Using Multiple Sub-Image Generation and a Programmable Moving-Matrix Light Valve" which application relies on provisional application Ser. No. 60/026/060 filed Sep. 13, 1996, and entitled "Method and Apparatus for Sequential Exposure Printing of Ultra High Resolution Digital Images Using Multiple Sub-Image Generation and a Programmable Moving-Matrix Light Valve".

TECHNICAL FIELD OF THE INVENTION

This invention relates to systems that input digital image files of varying size and resolution, process images with workstation software, rasterize images for the purpose of exposing photo-sensitive media, and produce photographic quality prints or film as the output product.

BACKGROUND OF THE INVENTION

The methods of the present invention were motivated by the detailed metaphors of the prophet, Ezekiel, when he revealed in the *Bible* the architecture and illumination of God's future temple.

Digital photographic printing systems can be identified as belonging to one of three general classifications—dot stream printing, line at a time printing, and area printing.

Dot stream printing is most typified by laser printers which project one dot of the image at a time. A movable mirror advances the dots across the X direction of the media and micro-stepping the media advances the dots down the Y direction of the media. Color printing requires a red laser, green laser, and blue laser to be optically positioned with perfect alignment. Lasers can produce small dot sizes with high resolution. However, the serial nature of printing every dot sequentially requires long exposure times, especially where ultra high resolution images contain over a hundred million dots. Also the extensive and frequent mechanical and optical alignments of laser printing makes laser systems expensive to purchase and maintain.

Line at a time printing electronically advances the mastering dots across the media with such speed that the entire line is considered to be printed simultaneously when compared to mechanical scanning. Special CRTs print one line of the image at a time. One line represents the X direction of the media and micro-stepping the media or the CRT advances the lines down the Y direction of the media. The resolution of line-type CRTs require multiple use in ultra high resolution printing. Because of mechanical limitations, multiple CRTs impose geometric alignment problems that complicate the raster image processing. Although CRTs print each line very fast, overall printing time is significantly slowed by the serial nature of sequencing thousands of lines mechanically and the general lack of intensity from CRTs.

Area printing is the simultaneous exposure of the entire area of an image in one optical projection. Traditional photographic film is classified as "area printing." For digital area printing, full screen CRTs, LCDs, and Digital Mirror Devices (DMDs) can print the entire X and Y directions of the image in one relatively short exposure time. Most area printing devices that use CRTs and LCDs use fiber optic face plates for connecting the emitted image to the media.

Area printing represents the fastest photographic printing technique, however full screen CRTs, LCDs, and DMDs lack significant resolution to print ultra high resolution images in a single area exposure. Additionally, CRTs lack high intensity and LCDs lack high contrast. Multiple DMDs have been utilized to multiply the resolution of an image by a factor of 2. The DMD geometry yields good contrast, but because of mechanical restrictions, ultra high resolution has not been achieved. When multiple DMDs have been used, these devices are non-moving and project simultaneous motion images.

Digital images come in a wide range of sizes and aspect ratios. However, photographic media has strict size standards by comparison. Resizing decisions must be made about each image. Normally the best image quality is maintained when no resizing is done. However, if a small image is to be printed at large magnifications then pixelization may become objectionable. Increasing the number of pixels will also increase the size of the image and require less magnification.

Raster Image Processing or RIPing is a procedure that is very output device specific. Raster requires light and this procedure produces a specific bitmap for driving the electronics that generates the light for each pixel. In most digital printing systems the image file format must be converted into one very large stream of instructions. For a "dot stream printing" system, up to 30 minutes of computer time for each image may be needed. To save time but not expense, this procedure is usually off loaded to a dedicated workstation or file server. Service bureaus have emerged for batch processing many RIP files going to a specific digital printer.

When increasing the size of an image it is very important that it be "resampled" to the larger size. Resampling is creating new pixels by interpolating selected neighboring pixels. One exhaustive interpolating algorithm is bicubic. The best interpolation for new pixels will also take the longest processing time. To maintain maximum image quality, the ratio of the old size to the new size is a very important consideration during resampling. Different resampling algorithms are dictated by different sizing ratios.

A need has thus arisen for an improved digital image printing system.

SUMMARY OF THE INVENTION

Every classification of digital image printing has advantages and limitations. The present invention establishes a new enhanced classification called "moving-matrix area printing" that uniquely combines the reliability and short exposure time enjoyed by area printing with the ultra high resolution desired from scanned printing. The present method of moving-matrix area printing reconstructs a digital image from multiple area exposures where the image pixel detail required for full resolution is synchronously mapped with the printing container pixel geometry required for full contrast. The entire X and Y dimensions of the image are printed during each exposure using a light valve which functions as a spatial area light modulator.

The most geometrically suitable technology for a moving-matrix design is the Thin Film Transistor LCD module. However, the highest resolution LCD module available provides only a "skeleton" for the photo quality that is ultimately produced to reconstruct ultra high resolution images. The results of printing one image with a LCD module is like viewing the image through a window screen matrix. The screen is so coarse that little more than 4% of the image is printed on the media, making a single matrix exposure look extremely low contrast. Low contrast is normally considered a major drawback to LCDs and the reason why LCDs are rejected for high definition printing. Low contrast geometry is an important attribute of the present invention and the moving-matrix design. Micro-stepping the LCD module as a moving-matrix and synchronously printing 24 "unique views" of the image reconstructs 100% of the image on photo-sensitive media.

Because of the mechanical design of CRTs and DMDs, these devices are not geometrically efficient with the moving-matrix design. However, that does not preclude their eventual use or the use of any spatial light modulator as a moving-matrix imaging device compatible with the present invention for the purpose of reconstructing ultra high resolution images by multiple sub-image area exposures.

The LCD module is the most geometrically efficient spatial light modulator or light valve for the geometric derivations used to multiply the resolution in the moving-matrix design. A LCD module for use with the present invention is the SHARP Electronics LQ10PX01. This LCD module geometry provides an excellent fit for the moving-matrix area printing method. Other LCD modules of slightly differing geometry only require computational adjustments for positioning and their use is not excluded from the present invention.

The LCD module is constructed with a repeating pattern of red, green, and blue filtered windows or pels. One set of RGB pels equals one pixel. There is also significant dead space surrounding each pel. Dead space is normally unrastered spatial modulation and accounts for the low contrast of LCD modules. In the moving-matrix design of the present invention, the "dead space" actually represents the additional "sub-image space" required to reconstruct high resolution images.

To obtain perfect color registration in the printed image and to produce the smallest pixel size, the moving-matrix method and apparatus of the present invention converts the RGB serial geometry of the LCD module to RGB layered geometry on the media. This conversion produces additional "sub-image space" valuable for resolution recovery and requires additive printing with 3 exposures for each "unique view" of the image. The total RGB image and the total geometric contrast will converge at the end of 72 exposures for an image and printing container resolution of 4096×3072.

Once the printing container is filled at 72 exposures, the geometric contrast is 100% and does not increase with additional overlays, but the image resolution will continue to increase as the number of unique image overlays increase. The moving-matrix design multiplies the number of true pixels from the best available LCD module by a factor of 24 and provides an engine for serious high definition printing. The standard moving-matrix container of 4096×3072 is also the platform used to multiply the resolution to 16384×12288.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
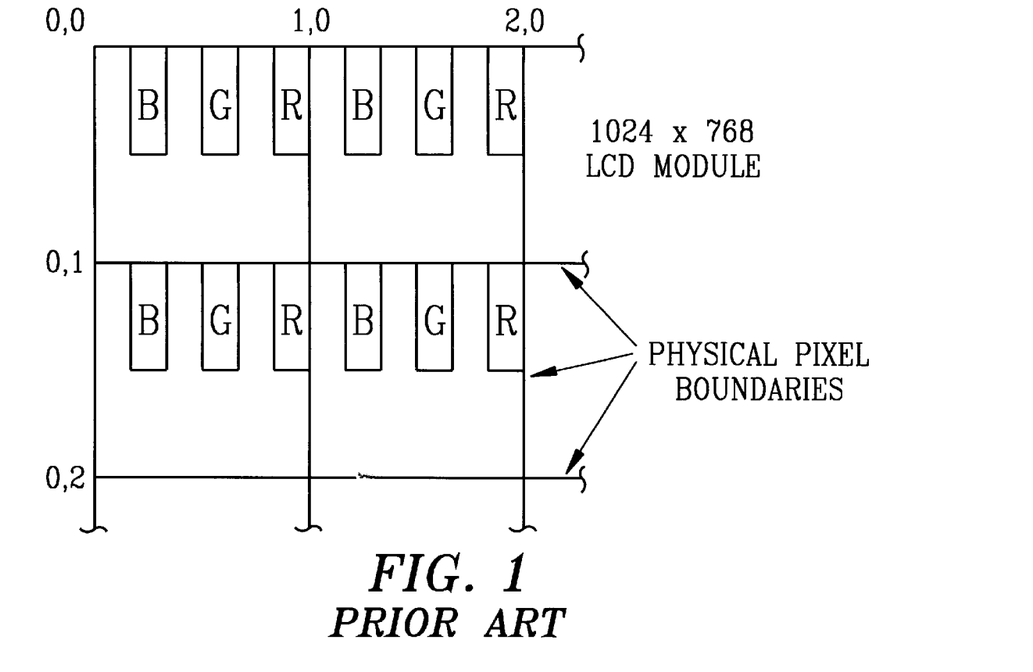
FIG. 1 illustrates a prior art sub-pixel geometry of a LCD module.

The precise geometric arrangement of logical pixels that establishes the size and resolution for a standard moving-matrix printing container is dictated by a particular LCD module pixel geometry. The prior art of FIG. 1 illustrates a typical sub-pixel geometry or placement of the RGB pels within a pixel for a thin-film-transistor LCD module. Multiplication of resolution is a function of the ratio of pixel size to pel size. Selecting a LCD module that produces an integer ratio provides for a more seamless reconstruction of ultra high resolution images. The moving-matrix of the present invention uses, for example, a SHARP Electronics LQ10PX01 LCD module. However, the present invention is not limited to this type of light valve and other LCD modules may be used. As used herein, the term spatial light modulator includes, but is not limited to, for example, a light valve or rastering device such as, for example, a LCD module or panel.

Figure 2:
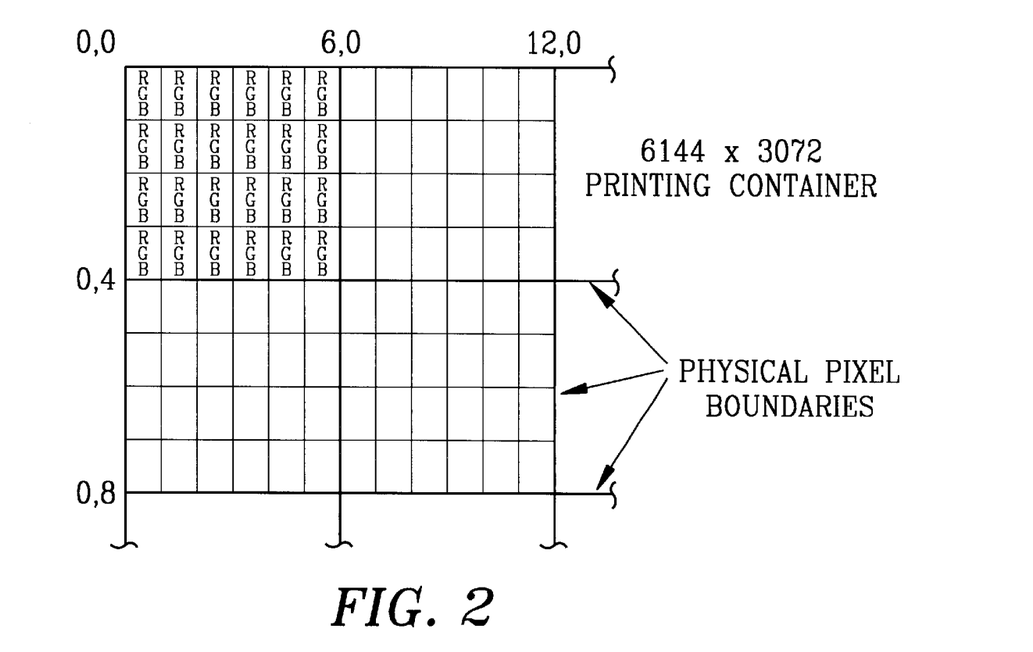
FIG. 2 illustrates the sub-image pixel arrangement within the pixel geometry of a LCD module printing container of the present invention.

Logical pixel arrangement within the physical pixel geometry for an LCD module is illustrated in FIG. 2. The present high resolution "virtual LCD module" is constructed from the pel components of the LCD module. It can be seen from FIG. 1 that the LCD module arranges the RGB pels in a serial repeat pattern with space on all sides of each pel. The pel arrangement shown in FIG. 2 is repeated in three layers for each RGB color. The RGB serial geometry of the physical LCD module has been converted to RGB parallel geometry in the present high resolution "Virtual LCD module." Each RGB pel of the physical LCD module has 24 logical positions in the "virtual LCD module." The moving-matrix of the present invention replicates a high resolution "virtual LCD module" using a standard physical LCD module. The highest true resolution of a state-of-the-art LCD module, such as the LQ10PX01 LCD module, is 1024×768. The true resolution of the present "virtual LCD module" as a moving-matrix printing container is 6144× 3072. The 2,359,296 physical RGB pels of the highest prior art resolution LCD module has been multiplied 24 times to 56,623,104 true printed pixels in three RGB layers in the present invention.

Although the moving-matrix aspect ratio of 6144 to 3072 is a geometric necessity for 100% seamless contrast, it is not the logical aspect ratio chosen to represent the printing container size for raster image processing. The logical aspect ratio of 4096 to 3072 was determined to be a more suitable printing container for most images.

Therefore, the 4096×3072 "image container" is spatially distributed into the 6144×3072 moving-matrix with a pixel assignment pattern that has staggered redundancy. Although the X direction true resolution is somewhat reduced, the printing effect of the higher resolution is maintained. The 4096×3072 "image container" is also the ideal size for very fast sieve-sort processing that is necessary to generate each set of raster images.

For the purpose of the present invention, true resolution is strictly distinguished from virtual resolution in that true resolution is generated with pixels that do not contribute spatial modulation inside the boundaries of neighboring pixels. Virtual resolution increases as virtual pixels are created by the intersections of multiple true resolution pixels that have diagonal displacements. Although virtual pixels can be unique pixels, virtual pixels have spatial modulation components that are shared with neighboring pixels. Therefore, virtual pixels add image smoothness but dilute the edge definition of high contrast features. The thinnest line or smallest detail that can be reconstructed by the imaging system is determined by the true resolution.

The pixel geometry projected in most photo digital imaging systems that print to film or paper is round. Round pixels are printed because lasers emit round beams and most CRTs have a round mask for the round electron beam. Only the Digital Mirror Devices and LCDs have square pixels. All systems that use round pixels must use a larger pixel diameter than pixel pitch in order to cover from one boundary to the next boundary. Pixel size for a very good laser imaging system is 20 microns. In any case the pixel size is only meaningful when compared to printing resolution and pixel pitch. Even when pixels are round, boundaries are square. For a round pixel to completely fill the pitch boundaries, the pixel diameter must be 41.4% larger than the pitch which always produces overlap and contributes spatial modulation inside the boundaries of neighboring pixels. Using a round pixel to fill square boundaries is the same problem of trying to cover the kitchen floor with round tiles instead of square tiles. The pixel diameter of some digital printing systems is actually several hundred percent larger than the pitch based on the stated resolution. These are the systems that produce no better results on high resolution than on medium resolution.

The moving-matrix apparatus of the present invention projects a square pixel because LCD modules form square pels or RGB windows where the thin film transistors are deposited. The square pixel is geometrically more efficient than round pixels in covering the pitch boundaries with almost 0% overlap. Less overlap produces more precise details in the image being reproduced. If boundaries do not meet perfectly or have a very small overlap then a grid effect may be seen in large print sizes. The moving-matrix of the present invention is precisely positioned with programmable micro-stepping motors. Special positioning and focusing techniques are used to "brush out" any minor grid effects in very large print sizes. The moving-matrix produces an effective pixel size for true resolution of 42 microns. Virtual resolution produces a virtual pixel size of 21 microns for a 8192×6144 image, 14 microns for a 12288×9216 image, and 10.5 microns for a 16384×12288 image. Therefore, in an ultra high resolution image reconstruction there will be multiple virtual pixels nested within a 42 micron true pixel.

The present invention compounds the resolution of the moving-matrix with additional "layers" of sub-images and adds virtual resolution to the standard printing container true resolution of 4096×3072. Two layers of sub-images doubles the resolution to 8192×6144 and represents an original image file of 151 megabytes. Three layers of sub-images triples the resolution to 12,288×9216 and represents an original image file of 340 megabytes. Four layers of sub-images quadruples the resolution to 16,384×12,288 and represents an image file of 604 megabytes. The main resource requirement for compounding of resolution is RAM memory and workstation speed.

In addition to increasing image resolution, compounding overlaid images with the moving-matrix corrects an annoying flaw that occurs with LCD modules. Perfect imaging devices do not exist and the LCD module can have one or more inactive pixels with one or all three colors affected. Because this invention multiplies the resolution of a LCD module by 24, one defective pixel in the LCD module multiplies the defect by 24 in the printed image. This can represent a small but undesirable off-color dot on the print.

Figure 3:
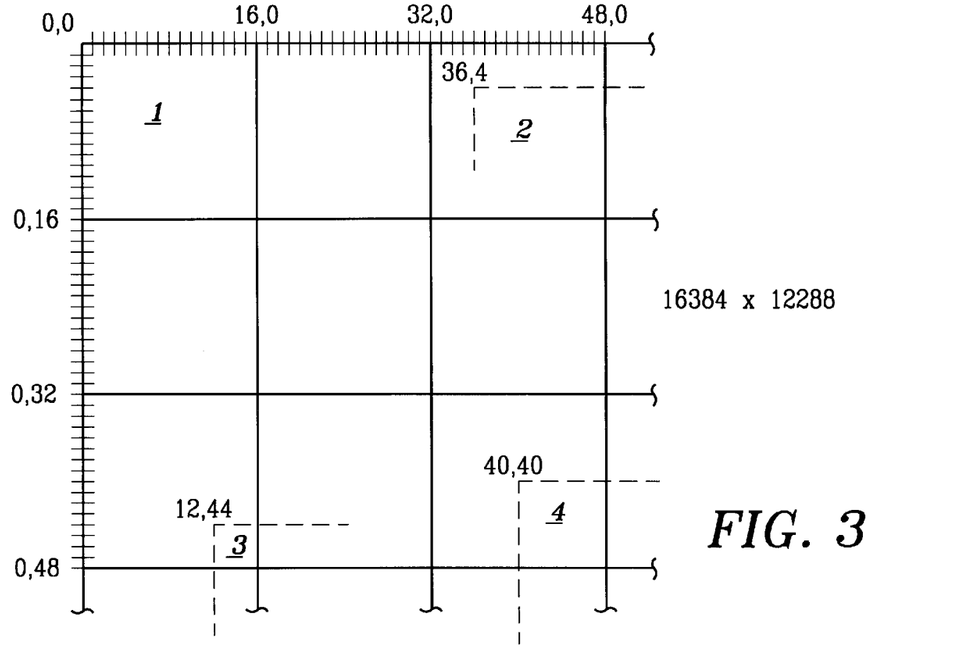
FIG. 3 illustrates the diagonal displacement of four 16384×12288 images before generating four unique 4096×3072 intermediate images.
Figure 5:
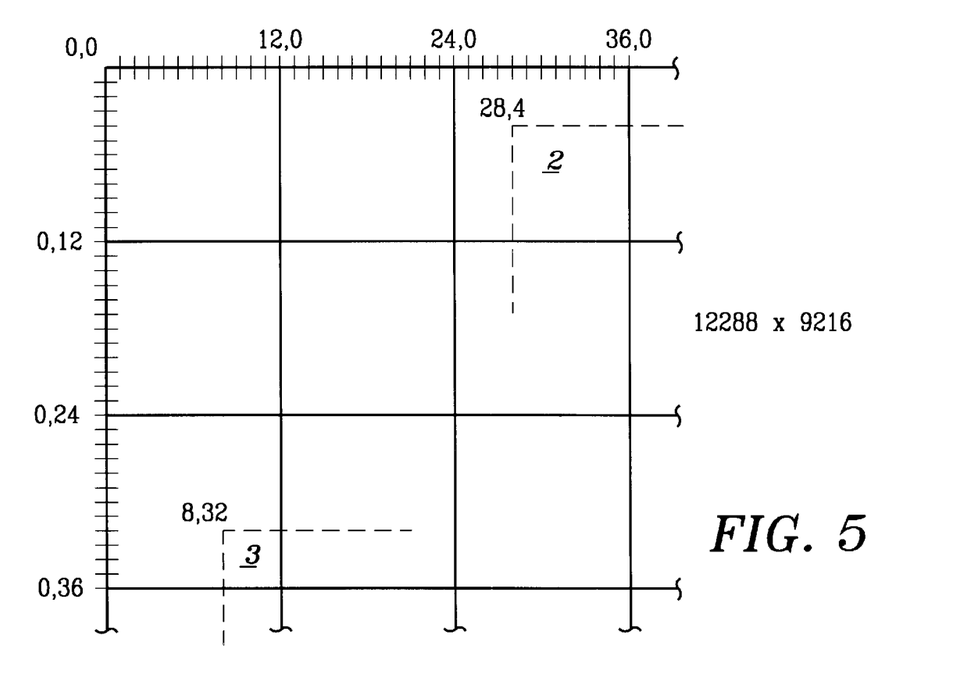
FIG. 5 illustrates the diagonal displacement of three 12288×9216 images before generating three unique 4096×3072 intermediate images.
Figure 7:
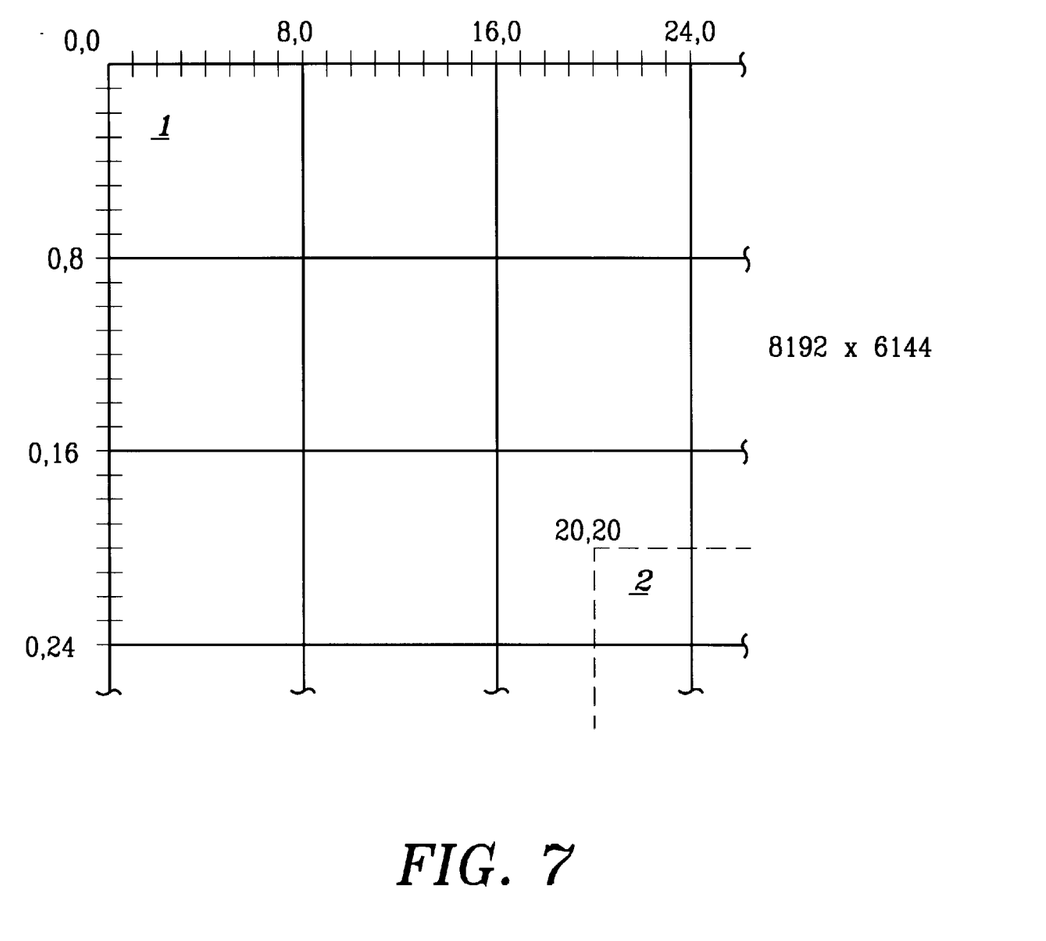
FIG. 7 illustrates the diagonal displacement of two 8192×6144 images before generating two unique 4096×3072 intermediate images.

The present invention almost completely eliminates the effect of inactive LCD module pixels by modifying the diagonal displacement when compounding the resolution. FIG. 3, FIG. 5, and FIG. 7 illustrate how additional diagonal displacements are added to the moving-matrix offsets for various original image sizes. All inactive pixels are overlaid with a diagonal neighbor two "doors" away to share the printing burden. Instead of one small dot that is off-color and stands out, there will be a diffusion of small non-contiguous dots where each off-color dot is so highly muted from overlaid good dots that the flaw cannot likely be discovered at all.

Zooming in on the origin of an ultra high resolution image, FIG. 3 illustrates how four 16384×12288 images are uniquely displaced in both the X and Y directions of the image container before resampling the image down to 4096×3072. The first component of the displacement is determined by the moving-matrix position for image reconstruction. A second component is added to the displacement for recovery of defective pixels in the LCD module.

Image position 1 always has a diagonal displacement of zero with coordinates of 0,0.

Image position 2 has additional X direction displacement with coordinates of 36,4.

Image position 3 has additional diagonal displacement with coordinates of 12,44.

Image position 4 has additional Y direction displacement with coordinates of 40,40.

Since the images will have shifted origins in the image container, the printing locations of defective pixels in the LCD module during positioning of the moving-matrix will also be shifted for every sub-image set. It is apparent that a very small percentage of the image border is sacrificed due to diagonal displacement. However, the print quality from pixel recovery is of far greater value than saving 0.3% to 0.4% of the image border.

Figure 4:
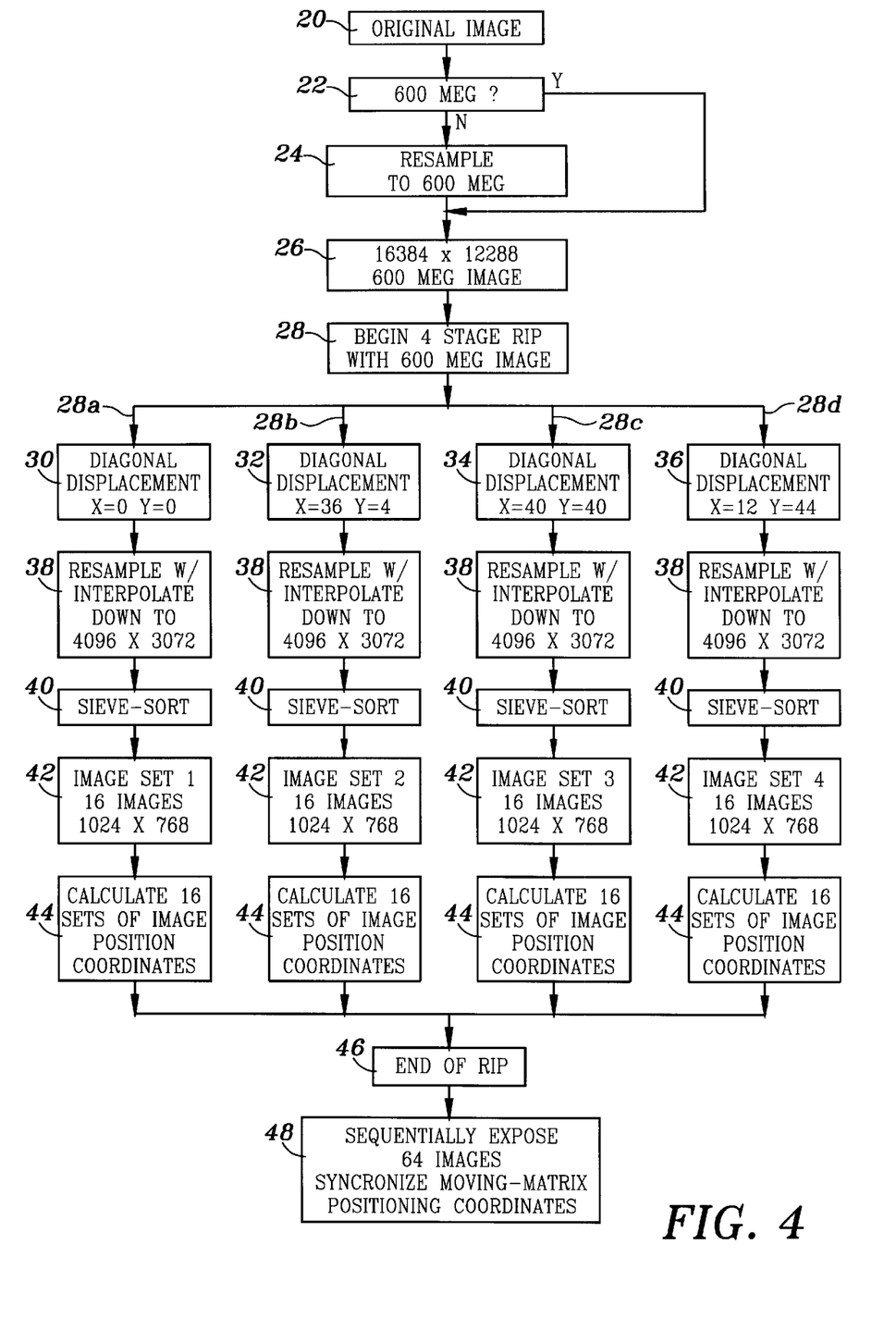
FIG. 4 is a flow chart of the raster image processing of a 16384×12288 image file.

The present invention embodies two components of processing logic to prepare an ultra high resolution image for printing. The first component is compounded virtual resolution and the second is generating the 4096×3072 true resolution component. This entire procedure for a 16384× 12288 image is illustrated in FIG. 4. The original image is loaded into a container-file at step 20. The original image is received in a digital format, digital raster file, from a digital source, and may be formatted using graphic files, such as, for example, TIF, JPG, BMP, and PCD formats, which are stored, for example, on a CD ROM. The original image may be generated from a digital source such as, for example, a CCD camera or from a film digitizer/reader. A determination is made at step 22 as to whether the original image contains 600 megabytes. If the image does not contain 600 megabytes, it is resampled at step 24 to a size of 600 megabytes. The resulting image is a 16384×12288 image at step 26. At step 28, the raster image processing begins, and is carried out in four stages, 28a, 28b, 28c, and 28d. After applying the diagonal displacement of FIG. 3 at steps 30, 32,34, and 36, each original image is resampled down to a 4096×3072 intermediate image at step 38. Using a bicubic resampling algorithm which includes neighboring pixels, a unique intermediate image is generated for each of the diagonally displaced original images. A one pixel displacement in the original image represents a ¼ pixel displacement in the intermediate image. Since a ¼ pixel does not exist, bicubic resampling resolves the intermediate 4096×3072 images to four "unique ¼ views" of the original image.

Each intermediate 4096×3072 image is sieve-sorted at step 40 into 16 unique sub-images that fit the 1024×768 printing container at step 42. The 16 sub-images retain the true resolution of the intermediate image. The origin of each sub-image within the intermediate image can be defined as "Image x,y" where x and y range from 0 to 3. For each of the 16 unique sorts the sieve-sorter begins at x,y and scans the 4096×3072 intermediate image while arranging every fourth pixel on every fourth row into a 1024×768 sub-image container. The sieve-sort process is repeated for every 4096× 3072 intermediate image. For a 16384×12288 original image, 64 unique sub-images are processed for rasterization and positioning coordinates are calculated for each sub-image at step 44.

To reconstruct the original image, each sub-image is rastered sequentially on the spatial light modulator while the modulator position is synchronized to the sub-image coordinates. The latent sub-images are raster scanned on a spatial light modulator (SLM) which is moved to coordinates that correspond to the coordinates of the position of each of the sub-images with respect to the original image. Each raster scanned sub-image is rastered for a length of time and intensity to expose the sub-image onto a photographic media, such as, for example, conventional RA-4 sensitized color material, in an additive manner. Each latent sub-image is sequentially exposed on the photographic media to create the final photographic print of the original digital image. Raster image processing is completed at step 46 which results in recreation of 64 unique sub-images and the positioning coordinates at step 48.

Figure 6:
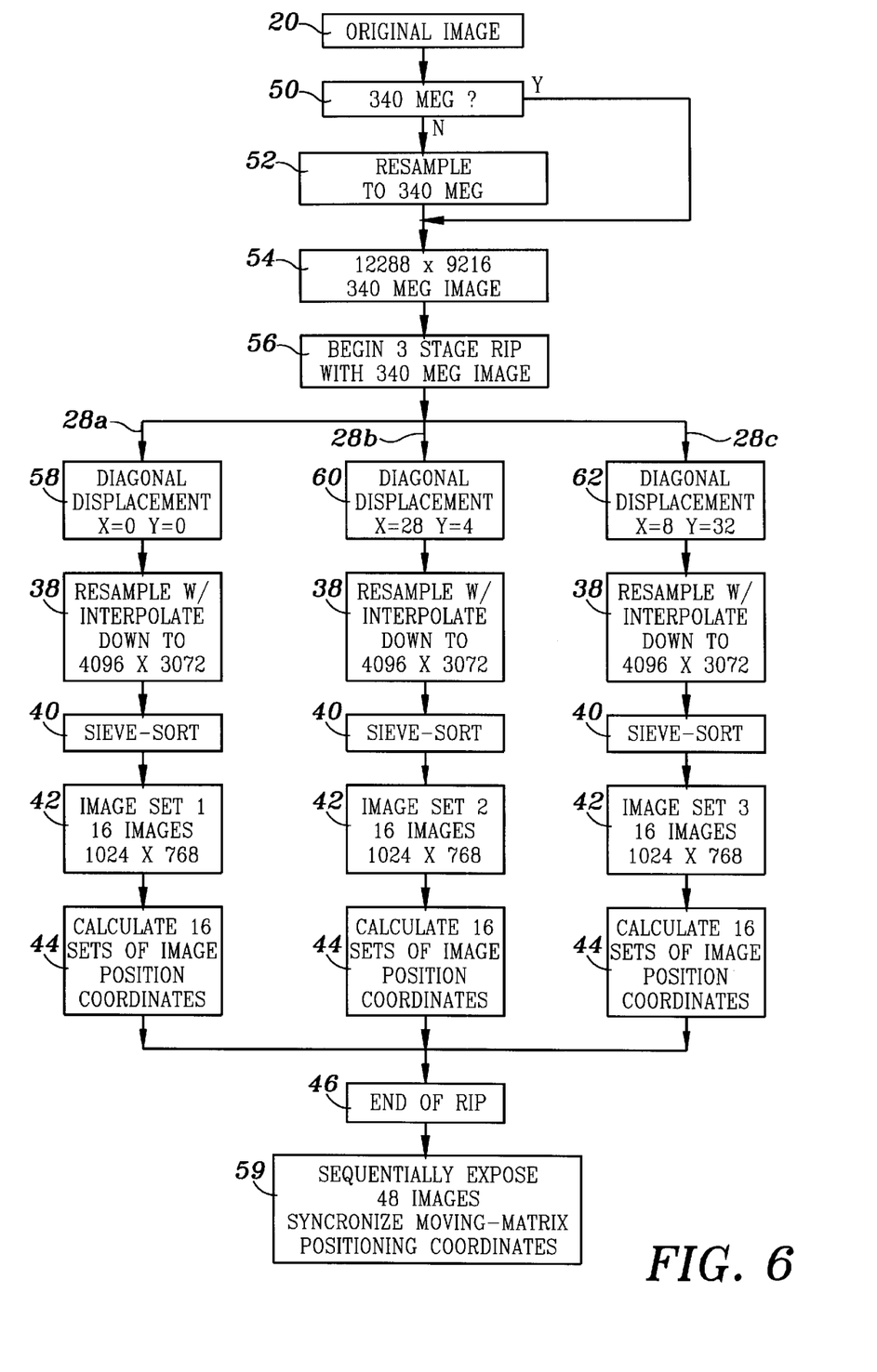
FIG. 6 is a flow chart of the raster image processing of a 12288×9216 image file.

Not all images require printing at ultra resolution. Therefore, the present invention provides for abbreviated hooks into the sub-image generation process. Starting with an original image size of 12288×9216, three unique intermediate 4096×3072 images are generated. FIG. 5 illustrates the diagonal displacements for each image. FIG. 6 illustrates that after the intermediate images are generated, the process continues as previously described except fewer sub-images 28 are used to reconstruct the original image. A determination is made at step 50 as to whether the original image file contains 340 megabytes. If the image does not contain 340 megabytes, the image is resampled at step 52. Step 54 represents an image size of 12288×9216. A three stage raster image processing step begins at step 56 with the 340 megabyte image. The three stages 28a, 28b, and 28c perform image processing for each of the diagonal displacements of FIG. 5 at steps 58, 60, and 62. The process continues as described with respect to FIG. 4. Raster image processing is completed at step 46 and results in 48 images being generated at step 58.

Figure 8:
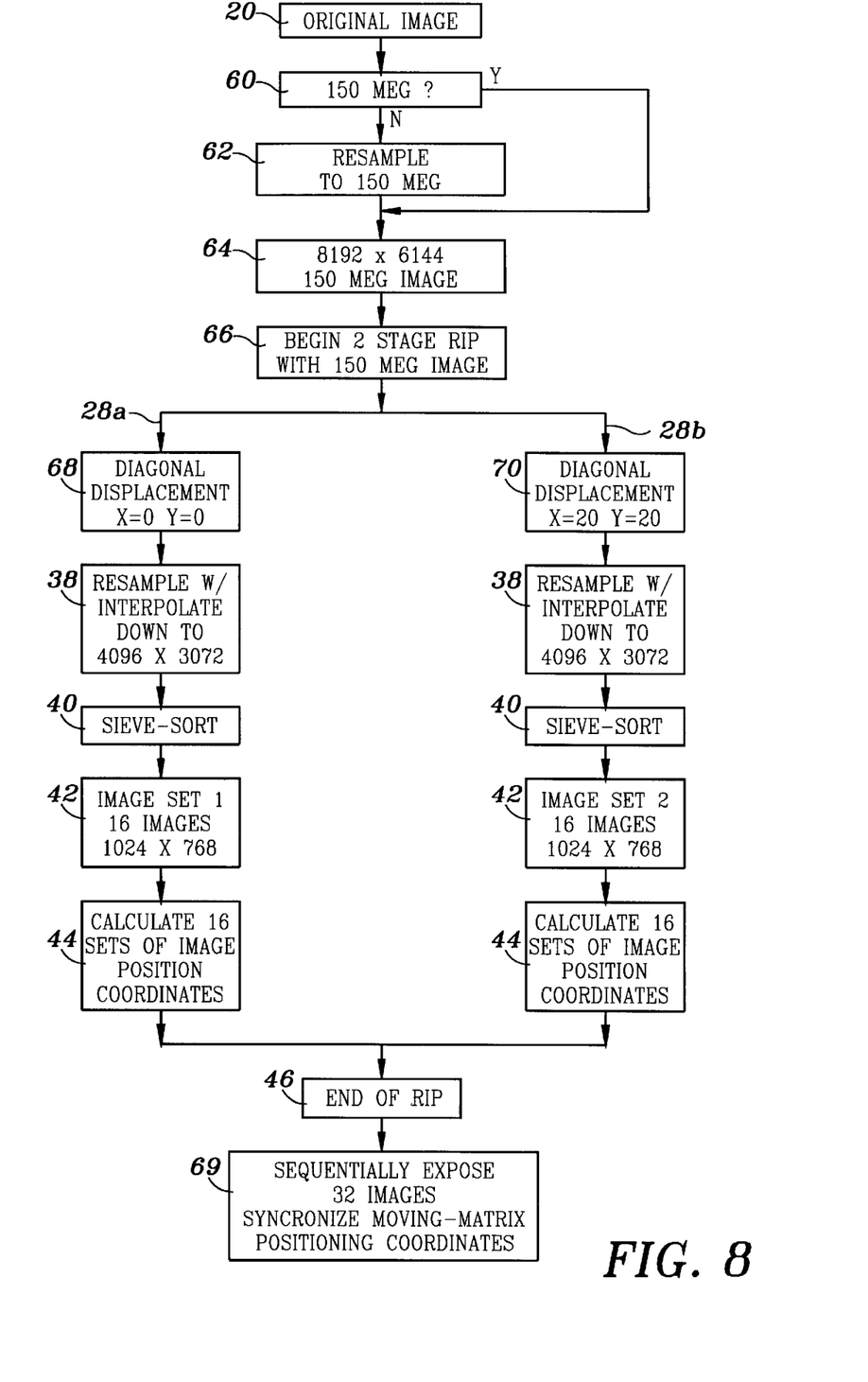
FIG. 8 is a flow chart of the raster image processing of a 8192×6144 image file.

FIGS. 7 and 8 illustrate a further abbreviation of the sub-image generation process to a 8192×6144 original image. FIG. 7 illustrates the diagonal displacements for each image. FIG. 8 illustrates that after the intermediate images are generated, the process continues as previously described with respect to FIG. 4, except fewer sub-images 28 are used to reconstruct the original image. A decision is made if the original image contains 150 megabytes at step 60. If the decision is no, the original image 20 is resampled at step 62. The resulting image is a 8192×6144 at step 64.

The two-stage raster image processing with a 150 megabyte image begins at step 66 in two stages, 28a and 28b. After applying the diagonal displacement of FIG. 7 at steps 68 and 70, the process continues as previously described with respect to FIG. 4, resulting in 32 images at step 68.

Figure 9:
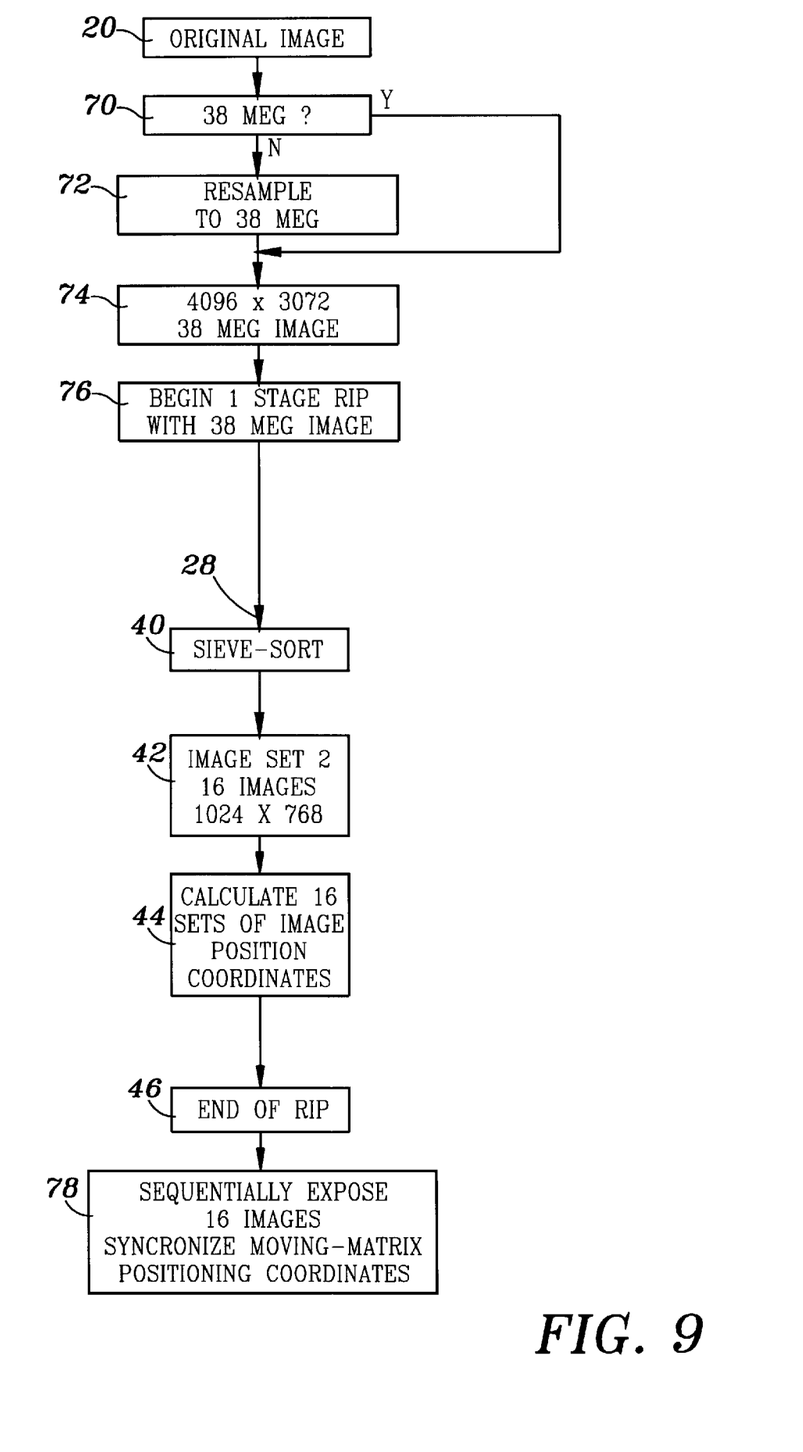
FIG. 9 is a flow chart of the raster image processing of a 4096×3072 image file.

FIG. 9 illustrates processing of an original image 20 of a 4096×3072 image which is processed into 16 images without the benefit of diagonal displacement processing. A decision is made at step 70 to determine whether the original image contains 38 megabytes. If the original image does not contain 38 megabytes, the image is resampled to 38 megabytes at step 72. The 38 megabyte image of 4096×3072 at step 74 is then raster image processed at step 76 which begins a one stage image processing step, as previously described with respect to FIG. 4, and results in the generation of 16 images at step 78.

Figure 10:
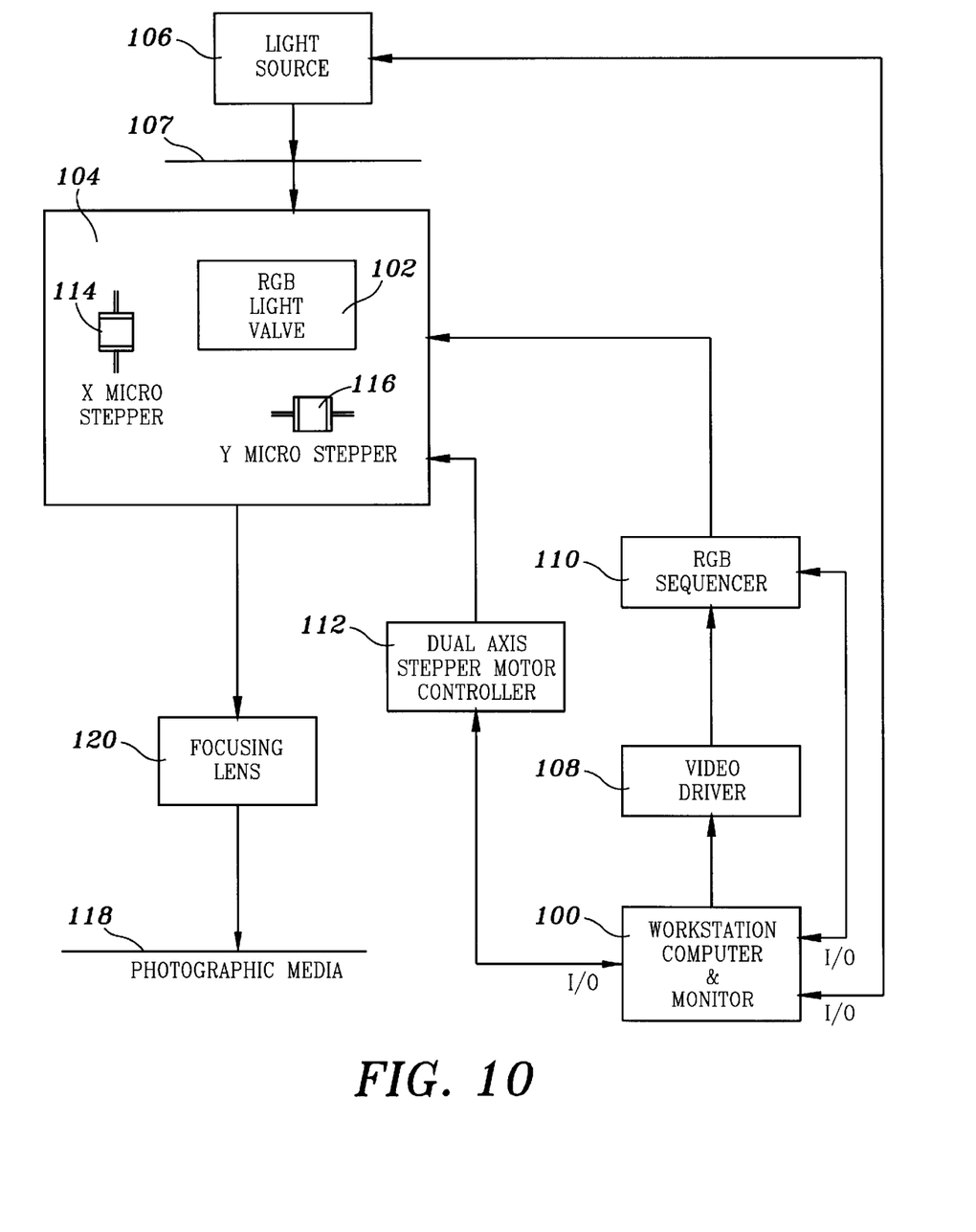
FIG. 10 is a block diagram of basic components and signals for the moving-matrix area printing apparatus of the present invention.

The hardware configuration of the multiple sub-image moving-matrix system is illustrated in FIG. 10. The major interconnections are shown for video signals and positioning control. The main software components reside in a workstation computer 100. The software components process an input digital image file into a series of raster images that are transmitted to a spatial light modulator such as, for example, a LCD module 102 located in a digital drawer 104. This task is very memory intensive and therefore, the speed of the workstation computer 100 is important. The workstation computer 100 can also be used for image enhancement processing. Typical software products used for this purpose are Photoshop and Paint Shop Pro. However, time spent on image enhancement is time taken away from printing. The workstation computer 100 includes an exposure task controller for carrying out photographic printing functions. While the workstation computer 100 is processing time sensitive functions like RIP, the task controller can be simultaneously used for image compose, crop, focus, job info, etc. The task controller also communicates commands to the light source 106 for exposure control. Light source 106 has a spectral output within the range from ultra-violet to visible to infra-red. Photographic media 118 has spectral sensitivities ranging from ultra-violet to visible to infra-red. A filter 107 functions to match the spectral characteristics of the light source 106 to the spectral characteristics of photographic media 118. This dual processing nature saves valuable time and increases the prints per hour. The workstation computer 100 uses the controller's monitor to communicate messages to the user during printing, when the CRT monitor screen must be kept dark.

A video driver 108 and RGB color sequencer 110 shown in FIG. 10 control the additive printing procedure while the workstation computer 100 is synchronously positioning the LCD module 102 for each rastered sub-image. A dual axis stepper motor controller 112 receives positioning prompts from the workstation computer 100 during the printing procedure and then generates specific X and Y direction moves for the digital drawer 104. Concurrently, the sequencer 110 receives video images from the workstation computer 100 and then routes the selected RGB video to the LCD module 102.

The digital drawer 104 shown in FIG. 10 contains the LCD module 102 with video electronics and dual axis micro-stepping positioners 114 and 116 necessary to reconstruct and project high resolution images onto photographic media 118. The micro-stepping positioners 114 and 116 have a homing position that is switch detected and communicated to the stepper motor controller 112. A focusing lens 120 is the optical interface between the image forming glass in the LCD module 102 and the photographic media 118.

Figure 11:
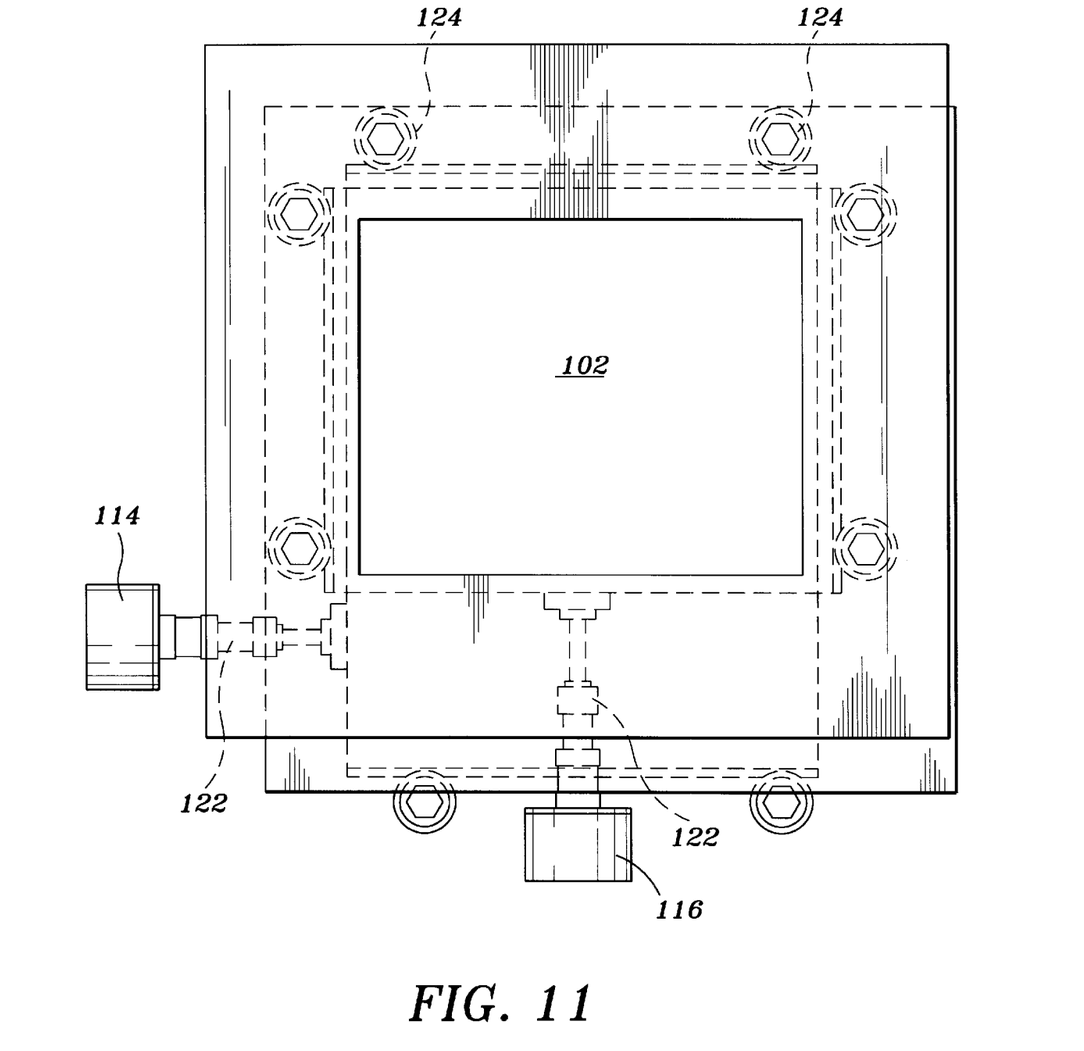
FIG. 11 is a top view of the dual axis moving-matrix printing apparatus.
Figure 12:
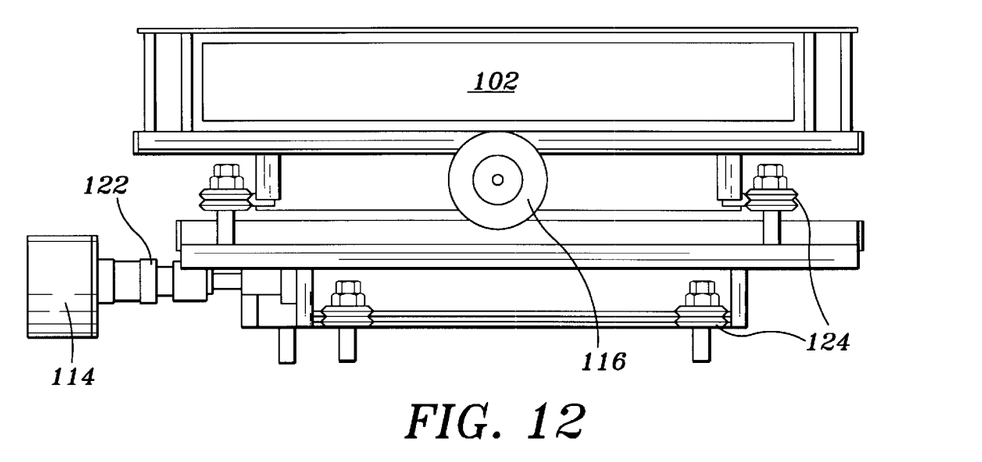
FIG. 12 is a front view of the moving-matrix printing apparatus.
Figure 13:
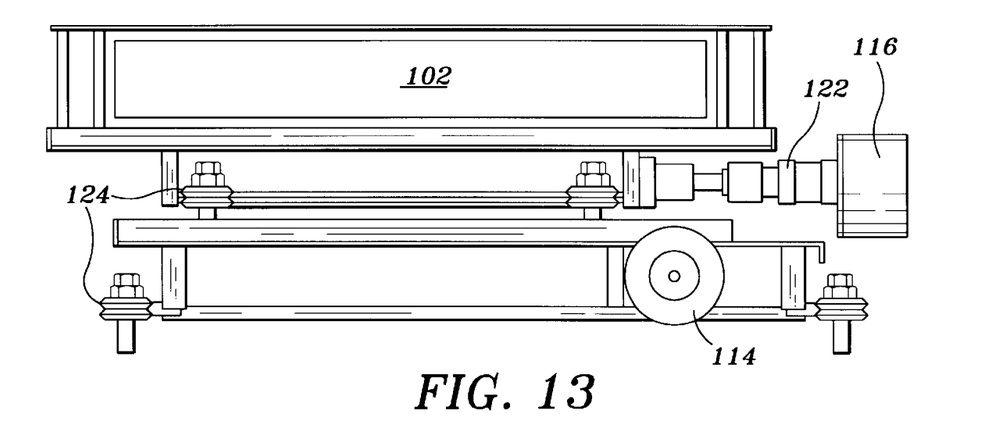
FIG. 13 is a side view of the moving-matrix printing apparatus.

The positioners 114 and 116 shown in FIGS. 11–13 have a micro-stepping resolution of 0.4 microns. Pixel registration error on a 40 inch print due to positioning resolution is less than 1/10,000 of an inch. In the 4096×3072 resolution mode the LCD module 102 is moved in calculated patterns ranging from 35 microns to 173 microns in both the X and Y directions. In higher resolutions modes the LCD module 102 is moved in calculated patterns up to 535 microns.

The moving-matrix design of the present invention embodies a low profile arrangement of the positioning components while providing for near zero backlash in the movement. Net positioning error due to backlash is less than 0.5 micron. FIGS. 11–13 illustrate the positioning system attachment design to achieve absolute mechanical stability. The anti-backlash leadscrew assemblies 122 and the anti-backlash thrust bearings 124 for both the X and Y positioning are secured to a rigid framework with facemounts.

Even though the center openings of the moving stages is relatively large, this design distributes the lateral force between the moving stages over a very large perimeter. The two inter-stage movable support systems for X and Y movement use opposing pairs of "V" bearings with adjustable pressure against their mating "V" rails. The stepper positioners 114 and 116 are connected to the positioning assemblies through anti-backlash flexible couplings. The moving-matrix stepper positioners 114 and 116 are powerful enough to operate the system in any gravitational orientation.

Figure 14:
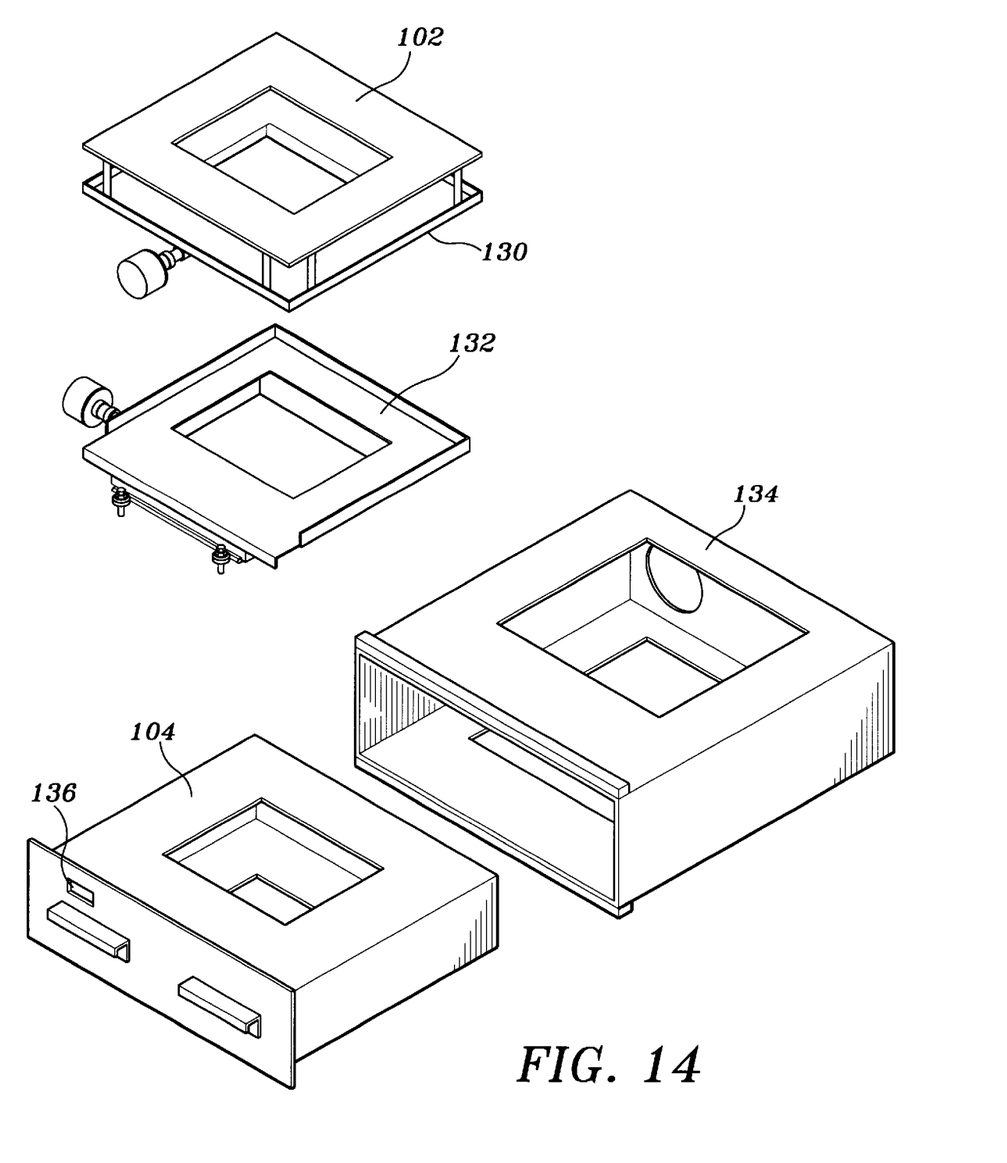
FIG. 14 is an isometric view of the moving-matrix printing apparatus.

FIG. 14 illustrates how the moving-matrix is assembled into Y positioning stage 130 and X positioning stage 132 are assembled into the transportable digital drawer 104. The digital drawer 104 easily slides out and in a receiver housing 134 while engaging several connectors for power and signals. An infrared window 136 at the front of the digital drawer 104 directs setup information into the LCD module 102 memory from a remote control unit. On the rear of the digital drawer receiver are the power drivers for the micro-stepping positioners 114 and 116 and the power supply for the LCD module 102. Both of these units must be in close proximity to the digital drawer components, yet not contribute any heat to the LCD module 102.

Calibration procedures in digital printing systems are always device specific. Resizing or resampling is a common procedure that is specifically used in the present invention to calibrate the image size to the size of the moving-matrix printing container. Image container sizes are multiples of 4096×3072 up to an ultra resolution size of 16384×12288. Images can be sized up or sized down to fill these container sizes. If the container is not filled, then the multiple sub-image processing software can either automatically do it's own resampling or it can merge the image into a black background. In either case the moving-matrix always prints on a multiple of 4096×3072. Approximately 60 seconds is added to the image processing time if images are not pre-sized or pre-merged into the container size multiples. Therefore, greater production is achieved by pre-sizing or pre-merging images at an editing station as a part of the image preparation procedures.

Other calibration procedures that are a necessary part of the present invention include matching the tonal range of the image to the rasterization range of the LCD module 102 and the reproduction range of the photographic media 118. For preprocessing efficiency, the calibration procedure can also be performed at a separate editing workstation. A test image is used to calibrate parameters for variables such as the levels redistribution table for the LCD module 102, levels redistribution table for the photographic media 118, and tracking table for device specific scanners.

Raster Image Processing or RIP is a procedure for generating and printing multiple sub-images. However, compared to other high resolution digital printing system, the moving-matrix design dictates a radically different approach to producing a raster image file. The video mode that the LCD module 102 operates in is more compatible with area printing than the instructional RIP files that drive stream printing. The video mode is also the fastest mode for transferring large amounts of data over the distance between the workstation computer 100 and the LCD module 102.

For a 4096×3072 resolution RIP, the moving-matrix design requires a unique video image for 16 of the 24 moving-matrix positions. The image reconstruction logic requires 16 sub-images, but the image reconstruction geometry requires 24 sub-images. Therefore, 2 sub-images are duplexed in alternating patterns on each of the four image rows within the matrix. Each RIPed image is 2.4 megabytes with a raster container size of 1024×768. For a 8192×6144 resolution RIP, 32 unique sub-images are generated for 48 matrix positions. For a 12288×9216 resolution RIP, 48 unique sub-images are generated for 72 matrix positions. And for a 16384×12288 resolution RIP, 64 unique sub-images are generated for 96 matrix positions.

The time to process moving-matrix RIP files is dependent on several variables. If the source image file meets the moving-matrix container conditions for sub-image processing, then the RIP time is only 30 seconds for the basic 4096×3072 resolution. The source image must meet one of the two following conditions for the fastest RIPing: 1) the image has been pre-sized or pre-merged into a mask with X equal 4096, and Y equal or less than 3072, and Y is divisible by 4; or 2) the image has been pre-sized or pre-merged into a mask with Y equal 3072, and X equal or less than 4096, and X is divisible by 4.

If none of these conditions are met then the multiple sub-image processor will automatically do container sizing that requires approximately 60 seconds for basic 4096×3072 resolution and increases as the resolution increases. While it is time effective to do the container sizing and diagonal displacement processing at a remote edit station, the actual RIP process is faster for the processing of multiple sub-images than the time it would take to load pre-RIPed files.

Printing a quality image usually requires composing and cropping the image for the best presentation on photographic media. After the RIP procedure produces the first raster image, the task controller can be used to focus or compose the image and make optical adjustments for magnification while the RIPing procedure continues. When printing begins, the exposure time is automatically loaded into the workstation computer from the exposure task controller where calculations have already been made for magnification, paper comp, filter pack, f-stop, etc. During the exposure, the workstation computer and the task controller are communicating.

Printing begins as soon as the positioning system indexes the starting X and Y position for the first RIPed file. The file is opened by the workstation computer 100 and the RGB sequencer 110 sends video to the LCD module 102 for mastering each color component starting with blue, then green, and then red without turning off the light source 106 between colors.

While printing each file, the positioning system is moving the LCD module 102 to new X and Y coordinates during each color change. The new color is rastered at the beginning of the move and the old color is blanked at the end of the move. The LCD module 102 is rapidly moved a distance of only 34.5 microns during the color change. The color move time to color exposure time is a very small factor and will not affect color registration unless the color exposure time drops into the milliseconds range. While the workstation computer 100 is opening the next RIPed file, the light source 106 is turned off, and the positioning system is set to the next X and Y coordinates for the next sub-image. The overhead time is determined by the positioning system speed and the time to raster the image on the LCD module 102.

Printing time for the moving-matrix is determined only by the first 24 exposures required to produce a 100% (full geometric contrast) image on the media 118. The printing time for one digital image is approximately the same as the printing time for one photographic film image under the same conditions of light source intensity, lens size, f-stop, magnification, speed of photo-sensitive media, etc. With a 2000 watt light source, 300 mm lens at f8, and 8×10 magnification on RA4 color paper, the printing time constant is approximately 1 second per image. Therefore, the standard printing container of 24 images requires 24 seconds of exposure for an 8×10 print plus the overhead time for mastering and positioning each image. A 16×20 print under the same conditions requires approximately 2.6 seconds per image or 63 seconds for 24 images plus the same overhead time. When additional layers of images are printed to compound the resolution, then the exposure time for each image decreases proportionately. The 63 seconds to expose a 16×20 print will not increase when the resolution is increased from 4096×3072 to 16384×12288.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A photographic printing system for printing an original digital image onto photosensitive media, the system comprising:

a spatial light modulator having an area including an array of pixel positions, said modulator for rastering the digital image when the digital image is resampled, said array of pixels having at least one sub-pixel, such that each sub-pixel rasters a fractional part of said area;

a steady-state light source for illuminating said spatial light modulator area; and a positioning system for controlling registration of said spatial light modulator with the photosensitive media, such that each of said sub-pixels located with said pixels is micro-positioned vertically and horizontally to a plurality of positions within said area.

2. The system of claim 1 and further including:

an image control system for sequentially delivering a plurality of unique full area sub-images to said spatial light modulator and simultaneously delivering vertical and horizontal position coordinates to said positioning system and for controlling the timing of said light source, such that an accumulation of exposed sub-images on the photosensitive media will reconstruct a high resolution digital image with multiple exposures from a lower resolution of said spatial light modulator.

3. The system of claim 1 and further including:

an optical system for creating a non-contact registration of said spatial light modulator with the photosensitive media, such that a projection distance is established for the purpose of enlarging or reducing the printed digital image.

4. The system of claim 1 and further including:

a sub-image generator system for resampling a high resolution digital image into a plurality of unique lower resolution full area sub-images, such that said sub-image generator produces (n) number of unique area sub-images where (n) is equal to the number of sub-pixel positions that can be rastered within said pixel area of said spatial light modulator.

5. A method for photographically printing a digital image comprising:

exposing a latent-image onto a photographic media by positioning a spatial light modulator relative to the photographic media, the spatial light modulator having an array of pixels disposed in an X,Y area, the X,Y area being sufficient to contain the entire digital image when the digital image is resampled, and each pixel of the array having at least one sub-pixel position; and rastering the X,Y area such that each sub-pixel has a raster area that is a fraction of the X,Y area and such that a plurality of sub-pixel positions are required to raster the entire X,Y area.

6. The method of claim 5 and further including:

micro-positioning the spatial light modulator to each sub-pixel position;

sequentially exposing the photographic media with a plurality of digital sub-images, each of the plurality of digital sub-images containing a fractional resolution of the entire digital image at each of the sub-pixel positions; and accumulating a plurality of sub-images exposed on the photographic media, thereby multiplying the resolution of the spatial light modulator and the subsequently printed image by a factor equal to the number of sub-pixels per pixel.

* * * * *

UNITED STATES PATENT AND TRADEMARK OFFICE
CERTIFICATE OF CORRECTION

PATENT NO.   : 6,292,251 B1
DATED        : September 18, 2001
INVENTOR(S)  : Steven E. Holley et al.

It is certified that error appears in the above-identified patent and that said Letters Patent is hereby corrected as shown below:

Column 1,
Line 51, replace "mastering" with -- rastering --.

Column 11,
Line 21, replace "mastering" with -- rastering --.
Line 50, replace "matering" with -- rastering --.

Signed and Sealed this

Twelfth Day of March, 2002

Attest:

Attesting Officer

JAMES E. ROGAN
*Director of the United States Patent and Trademark Office*